(No Model.)

J. P. NORDLOW.
POCKET KNIFE.

No. 530,792.  Patented Dec. 11, 1894.

WITNESSES:
John A. Penning
J. W. Dicker

INVENTOR
J. P. Nordlow
BY
Munn & Co.
ATTORNEYS.

UNITED STATES PATENT OFFICE.

JOHN P. NORDLOW, OF WORCESTER, MASSACHUSETTS.

POCKET-KNIFE.

SPECIFICATION forming part of Letters Patent No. 530,792, dated December 11, 1894.

Application filed July 24, 1894. Serial No. 518,437. (No model.)

*To all whom it may concern:*

Be it known that I, JOHN P. NORDLOW, of Worcester, in the county of Worcester and State of Massachusetts, have invented a new and useful Improvement in Pocket-Knives, of which the following is a full, clear, and exact description.

My invention relates to an improvement in knives, and it has for its object to so fit a blade in a handle, that the blade may be expeditiously and conveniently opened and rigidly held in an open position no matter how long the blade may be; and a further object of the invention is to provide a means whereby from the exterior of the handle the blade when in position for use may be released, and will automatically assume at that time a position at an angle to the handle, thus enabling the blade to be closed without danger of the operator injuring his hand.

Another object of the invention is to so construct the blade that when pivoted in a handle it may be opened from the heel or tang thereof, and in a speedy manner.

Another object of the invention is to so construct the blade and handle that when the blade is in an upright position it is firmly locked in a maner which will prevent it from moving backward or forward.

The invention consists in the novel construction and combination of the several parts, as will be hereinafter fully set forth and pointed out in the claim.

Reference is to be had to the accompanying drawings, forming a part of this specification, in which similar figures and letters of reference indicate corresponding parts in all the views.

Figure 1:
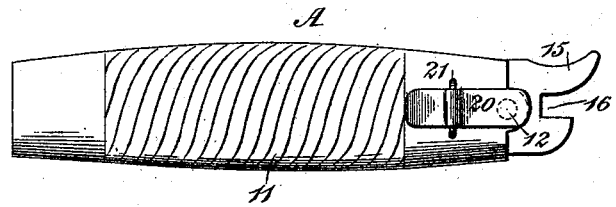
Figure 2:
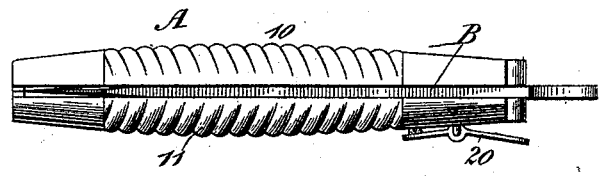
Figure 3:
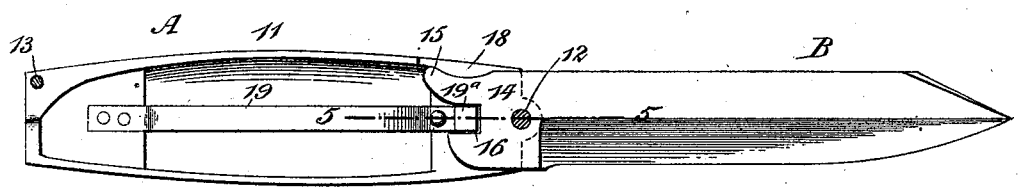
Figure 4:
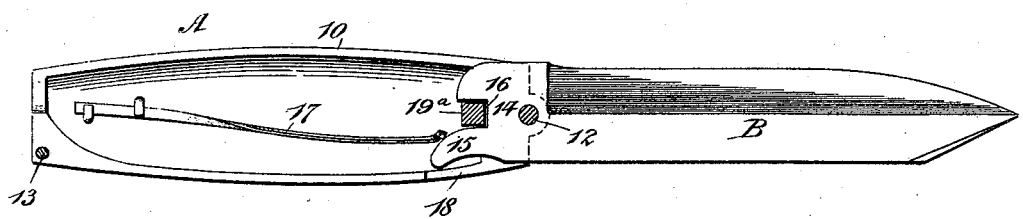
Figure 5:
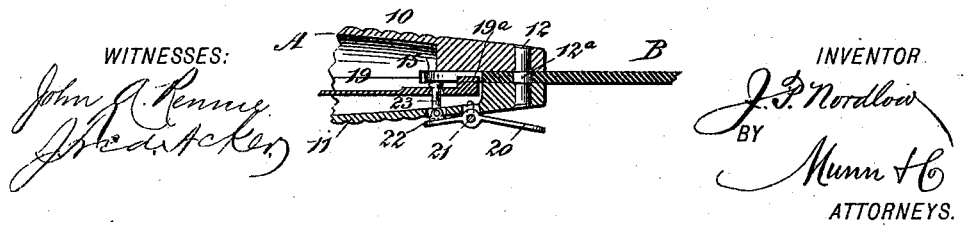

Figure 1 is a side elevation of the improved knife, the blade being closed in the handle. Fig. 2 is a plan view of the knife. Fig. 3 is a side elevation of the knife blade locked in open position in one section of the handle, the said handle section being viewed from its inner side. Fig. 4 is a view similar to Fig. 3, the opposite section of the handle being shown; and Fig. 5 is a section taken longitudinally and on the line 5—5 of Fig. 3.

The handle A is made preferably in two sections 10 and 11, adapted to be connected by a pivot 12 and one or more screws 13, the pivot and screws being located at opposite ends. The pivot, as shown in Fig. 5, is provided with an enlarged central portion $12^a$, and the said pivot is adapted to receive the blade B, a suitable aperture being made in the tang 14 of the blade to receive the enlarged portion $12^a$ of the pivot. The tang of the knife is provided with a heel 15 at one of its sides, preferably at the side opposite the back of the handle, the said heel being outwardly curved, as shown in Figs. 3 and 4; and adjacent to this heel, in the bottom portion of the tang a recess 16, is produced, preferably of a rectangular form. When the blade is carried to an open position, the heel 15 places a spring 17 under tension, which at one of its ends is secured for example in the section 10 of the handle, as shown in Fig. 4, the tendency of the spring being to throw the heel of the knife blade outward, a suitable slot 18 being made in the back of the handle for the outward passage of the heel. In the opposite section 11 of the handle another spring 19 is secured at one of its ends, and said spring at its free end is provided with a head $19^a$, adapted to enter and snugly fit into the recess 16 in the tang of the blade when the blade has been fully opened. The head section of the spring may be drawn from engagement with the tang of the blade through the medium of a latch 20, fulcrumed upon the outer face of one of the sections of the handle adjacent to the pivot 12, as shown best in Fig. 5. This latch consists of a plate the ends whereof are at angles to its pivot section, whereby the said plate may be rocked, and the pivot 21 of the latch is in staple form, as shown in Fig. 1.

The inner end, which is usually the shorter end of the latch 20, is provided with ears 22, and between these ears a pin 23 is pivoted, which pin is passed through the spring 19 near its head $19^a$, and the said pin is then enlarged in order that it may not slip from the spring.

In operation, when the knife blade is closed within the handle, as shown in Figs. 1 and 2, it may be quickly opened out therefrom by pressing downward upon the heel 15 of the blade, which is exposed at the pivot end of the handle. As the blade is carried outward to its open position, the spring 17 is compressed inwardly by the heel at the tang of the blade, and as soon as the recess 16 in said tang shall be brought over the head 19ª of the spring 19, said head will automatically enter the said recess and firmly lock the blade in open position, preventing it from moving forward or rearward. In order to close the blade, the outer end of the latch 20 is pressed against the handle, whereupon the head of the spring 19 will be drawn from the recess 16 in the blade, and the spring 17 exerting its influence in an outwardly direction against the heel 15 of the blade will at the same time throw the blade forward at an acute angle to the handle, carrying a side surface of the tang over the head 19ª of the spring. The blade may now be pressed downward into its handle without any trouble, since it will offer but little resistance, and as the blade is beveled at its cutting edge, before the blade is fully closed in the handle, the head 19ª of the spring 19 will have passed from the tang upon said beveled surface, and will serve as a lock for the blade in its closed position.

Having thus described my invention, I claim as new and desire to secure by Letters Patent—

In a knife, the combination, with a handle, having a locking spring interiorly secured to one section, the free end of the spring being provided with a head, a latch located upon the exterior of the handle, and a connection between the latch and the free end of the spring, whereby its head may be moved to and from the exterior of the handle, and a second or tension spring also secured upon the handle, substantially opposite the spring provided with a head, of a blade pivoted in the handle, the tang of the said blade being provided with a heel outwardly curved and engaged by the free end of the tension spring, the said spring having a tendency to force the heel outwardly, the tang of the blade being further provided with a recess adapted to receive the head of the locking spring, as and for the purpose specified.

JOHN P. NORDLOW.

Witnesses:
WILLIAM A. GILE,
GEORGE A. DRURY.